(12) United States Patent
Rojanski et al.

(10) Patent No.: US 10,355,349 B2
(45) Date of Patent: Jul. 16, 2019

(54) PROTECTIVE DOME FOR A DUAL MODE ELECTROMAGNETIC DETECTION SYSTEM

(71) Applicant: ISRAEL AEROSPACE INDUSTRIES LTD., Lod (IL)

(72) Inventors: Vladimir Rojanski, Petach Tikva (IL); Daniel Sudit, Rehovot (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 361 days.

(21) Appl. No.: 15/325,820

(22) PCT Filed: Jun. 14, 2015

(86) PCT No.: PCT/IL2015/050597
§ 371 (c)(1),
(2) Date: Jan. 12, 2017

(87) PCT Pub. No.: WO2016/020910
PCT Pub. Date: Feb. 11, 2016

(65) Prior Publication Data
US 2017/0170554 A1    Jun. 15, 2017

(30) Foreign Application Priority Data
Aug. 3, 2014  (IL) .......................................... 233924

(51) Int. Cl.
*F41G 7/00*        (2006.01)
*F41G 7/22*        (2006.01)
(Continued)

(52) U.S. Cl.
CPC ............... *H01Q 1/42* (2013.01); *F41G 7/008* (2013.01); *F41G 7/2246* (2013.01);
(Continued)

(58) Field of Classification Search
CPC .... H01Q 1/40; H01Q 1/42; F41G 7/00; F41G 7/008; F41G 7/2286; F41G 7/2293;
(Continued)

(56) References Cited

U.S. PATENT DOCUMENTS 2,700,323 A * 1/1955 Schroder ................ G02B 5/282
                                                    359/359
2,972,743 A * 2/1961 Svensson ........... H01Q 15/0013
                                                    250/353
(Continued)

OTHER PUBLICATIONS

D. J. Kozakoff in the article titled: "Analysis of Radome-Enclosed Antennas", Jan. 1, 2010, Artech House Inc, p. 67-70.
(Continued)

Primary Examiner — Peter M Bythrow
(74) Attorney, Agent, or Firm — Dorsey & Whitney LLP

(57) ABSTRACT

A dual mode electromagnetic detection system and a protective dome for the electromagnetic detection system are described. The protective dome includes a substrate having a portion transparent to both infrared radiation and radio frequency radiation. The portion of the substrate includes a macromolecular material including a polymer selected from a family of polyolefins and an antistatic additive.

13 Claims, 5 Drawing Sheets

(51) Int. Cl.
*G01J 1/04* (2006.01)
*G01J 5/08* (2006.01)
*G01S 7/02* (2006.01)
*G02B 1/16* (2015.01)
*H01Q 1/42* (2006.01)
*H01Q 5/22* (2015.01)
*G01S 13/86* (2006.01)
*G03B 29/00* (2006.01)

(52) U.S. Cl.
CPC .......... *F41G 7/2253* (2013.01); *F41G 7/2286* (2013.01); *F41G 7/2293* (2013.01); *G01J 1/0407* (2013.01); *G01J 5/0875* (2013.01); *G01S 13/865* (2013.01); *G01S 13/867* (2013.01); *G02B 1/16* (2015.01); *G03B 29/00* (2013.01); *H01Q 5/22* (2015.01); *G01S 2007/027* (2013.01)

(58) Field of Classification Search
CPC ...... G01S 13/86; G01S 13/865; G01S 13/867; G01J 1/0407; G01J 5/0875
See application file for complete search history.

(56) References Cited

U.S. PATENT DOCUMENTS

| | | | | | |
|---|---|---|---|---|---|
| 3,056,958 | A | * | 10/1962 | Anderson | G01S 11/023 250/338.1 |
| 3,165,749 | A | * | 1/1965 | Cushner | F41G 7/008 244/3.16 |
| 3,911,433 | A | * | 10/1975 | Redman | G01S 7/40 342/165 |
| 3,962,578 | A | * | 6/1976 | Roschen | G01J 1/4228 250/226 |
| 4,108,400 | A | * | 8/1978 | Groutage | F41G 7/008 244/3.15 |
| 4,264,907 | A | * | 4/1981 | Durand, Jr. | F41G 7/008 342/53 |
| 4,797,683 | A | * | 1/1989 | Kosowsky | H01Q 1/42 343/705 |
| 4,970,634 | A | * | 11/1990 | Howell | H01Q 1/42 342/1 |
| 5,103,241 | A | * | 4/1992 | Wu | H01Q 15/0026 343/872 |
| 5,182,155 | A | * | 1/1993 | Roe | B32B 3/12 428/116 |
| 5,323,170 | A | * | 6/1994 | Lang | H01Q 1/42 343/705 |
| 5,327,149 | A | * | 7/1994 | Kuffer | G01S 13/86 342/53 |
| 5,973,649 | A | * | 10/1999 | Andressen | H01Q 15/22 343/708 |
| 6,150,974 | A | * | 11/2000 | Tasaka | F41G 7/008 244/3.16 |
| 6,268,822 | B1 | * | 7/2001 | Sanders | F41G 7/008 342/175 |
| 6,307,521 | B1 | | 10/2001 | Schindler et al. | |
| 7,057,567 | B2 | * | 6/2006 | Koch | H01Q 1/281 343/700 MS |
| 7,183,966 | B1 | * | 2/2007 | Schramek | G01S 17/87 244/3.1 |
| 7,504,993 | B2 | * | 3/2009 | Young | G01S 7/4026 342/175 |
| 7,557,769 | B2 | * | 7/2009 | Picard | G02B 5/207 343/872 |
| 7,786,418 | B2 | * | 8/2010 | Taylor | F41G 7/008 244/3.1 |
| 8,581,161 | B2 | * | 11/2013 | Taylor | G02B 5/08 244/3.19 |
| 8,642,965 | B2 | * | 2/2014 | Hernandez | F41G 7/008 250/339.01 |
| 8,773,300 | B2 | * | 7/2014 | Stratis | H01Q 1/281 342/54 |
| 8,816,932 | B2 | * | 8/2014 | Kawaguchi | C23C 14/0015 235/487 |
| 9,316,463 | B2 | * | 4/2016 | Durand | F41G 7/26 |
| 9,896,220 | B2 | * | 2/2018 | Yokoi | H01Q 1/281 |
| 9,976,837 | B2 | * | 5/2018 | Boiman | H01Q 1/281 |
| 2007/0290941 | A1 | | 12/2007 | Brown et al. | |
| 2007/0290942 | A1 | | 12/2007 | Morin | |
| 2009/0002220 | A1 | * | 1/2009 | Lovberg | G01S 13/89 342/33 |
| 2012/0194405 | A1 | | 8/2012 | Brink | |

OTHER PUBLICATIONS

MIL-C-83231A, (Military Specification) titled "Coatings, Polyurethane, Rain Erosion Resistant for Exterior Aircraft and Missile Plastic Parts".
James W. Lamb in the article titled: "Miscellaneous Data on Materials for Millimetre and Submillimetre Optics", International Journal of Infrared and Millimiter Waves, Pringer, V. 17, N. 12, 1996, p. 1997-2034.

* cited by examiner

PROTECTIVE DOME FOR A DUAL MODE ELECTROMAGNETIC DETECTION SYSTEM

TECHNOLOGICAL FIELD

This invention relates generally to a dual mode electromagnetic detection system for receiving infra red (IR) radiation and radio frequency (RF) radiation simultaneously, and in particular to a dome that houses and protects a radiation antenna portion of the electromagnetic detection system.

BACKGROUND ART

Infra red (IR) seekers and radio frequency (RF) radars are well-known in the art to determine the position and velocity of distant objects.

For example, passive IR seekers can employ a forward looking infrared (FLIR) camera or other thermal imaging camera for detection of infrared radiation, typically emitted from a heat source, to create images of distant objects assembled for video output. IR seekers can be used to help pilots and drivers steer their vehicles at night, or to detect warm objects against a cooler background. Passive IR seekers offer accurate tracking capabilities due to their narrow beam width and high resolution of object details. However, IR seekers have limited operative capability in adverse weather conditions, when an object is obscured by clouds, fog, precipitation, smoke, dust or the like.

Active RF radar systems transmit radiation from antenna toward an object, which is then reflected back from the object towards the antenna. These systems can be employed in all weather. However, such RF systems provide limited discrimination between multiple objects, are limited in angular resolution, and are sensitive to radio frequency jamming.

It can be seen that the characteristics of IR seekers and RF radars are complementary. Therefore, dual mode electromagnetic detection systems are known that combine a passive infra red (IR) seeker and an active radio frequency (RF) radar in one device. These dual systems provide the advantages of both technologies.

In order to protect a thermal imaging camera of IR seekers and/or an antenna of RF radars from weather or conceal it from public view protective domes (also known as "radomes") are used. A dome is a structural, weatherproof enclosure that is constructed of material that minimally attenuates the electromagnetic signals transmitted or received by the detection system.

Generally, a variety of materials have been used for constructing protective domes. Historically, balsa and plywood were used in early antenna radome structures. Modern ground-based and ship-based antenna radomes are manufactured using composite materials such as fiberglass, quartz, and aramid fibers held together with polyester, epoxy, and other resins.

When a detection system employs both IR camera and RF radar, there is an interest in using a single dome for the both devices. In this case, the dome must be transmissive to a selected portion of the RF spectrum and a selected portion of the IR spectrum.

Microwave transmission through a material is decreased due absorption and/or reflection. The microwave reflection and absorption can, for example, be characterized by frequency-dependent dielectric constant and loss tangent of the material. It is important that the dielectric constant of the material in the selected portion of the IR and RF spectra is low. A low dielectric constant material reduces reflections. Reduced reflections minimize impact to the radiation pattern and insertion loss.

U.S. Pat. No. 5,327,149 describes a dual-mode, radio frequency, optical-wavelength detector apparatus that includes RF-transparent optical elements adapted to focusing optical energy in a wavelength range including ultraviolet through infrared wavelengths, on an optical detector, and an RF antenna located behind the optical elements. The apparatus also includes a protective dome made of zinc sulfide (ZnS), which has a relatively low loss factor and suitable dielectric constant (i.e., tan $\delta$=0.0024; $\varepsilon$=8.35) for transparency to both infrared and radio frequency energy.

U.S. Pat. No. 6,307,521 describes a reflector antenna arrangement that can transmit and receive both infrared (IR) and millimeter wave (RF) radiation. The arrangement includes a main reflector, a subreflector, an IR feed system, an RF feed system, a radome, and a bispectral window arranged in an opening provided in a central area of the main reflector. The radome has a hemispherical single layer having a constant wall thickness, and is made of a dielectric material, preferably ZnS.

U.S. Pat. No. 7,786,418 describes a multimode detector system including an imaging infrared (IIR) seeker and a radio frequency (RF) seeker for mounting on a missile. The IIR seeker and the RF seeker may view an outside scene through a dome. The dome may be transmissive to the selected portion of the RF spectrum and the selected portion of the IR spectrum. The dome may function to shield the components of the seeker from the outside environment and from the air stream when the missile is in flight. The dome may be essentially spherical, or may be conical, flat, or some other shape. The dome material may be glass, quartz, sapphire, or some other material selected for a combination of optical and mechanical properties.

U.S. Pat. No. 7,557,769 describes a radome and method making thereof. The radome comprises an electro-optic transparent substrate, a semiconductor coating on the substrate, and a frequency selective surface embedded in the coating. The substrate is one or a combination of glass, silicon, $MgF_2$, ZnS, and spinels, most preferably sapphire (with a GaN coating). The coating is one or a combination of GaP, GaN, GaAs, SiC, and Si.

General Description

Thus, there is still a need in the art for, and it would be useful to have, a novel protective dome for a dual mode electromagnetic detection system that would be characterized by relatively low loss factor and low dielectric constant.

It would also be beneficial if a protective dome would have high strength, high operating temperature and/or low maintenance costs.

The present invention partially eliminates the deficiencies of the prior art dual mode electromagnetic detection system, and provides a protective dome for an electromagnetic detection system. The protective dome comprises a substrate having a portion transparent to both infrared (IR) radiation and radio frequency (RF) radiation.

According to an embodiment of the present invention, the portion of the substrate transparent to both IR and RF radiation comprises a macromolecular material including a polymer selected from a family of polyolefins. Examples of the polyolefin polymers suitable for the dome include, but are not limited to, ultra high density polyethylene, high density polyethylene, low density polyethylene and polypropylene.

According to an embodiment of the present invention, the macromolecular material includes an antistatic additive.

According to one embodiment of the present invention, the substrate has a uniform thickness.

According to another embodiment of the present invention, the substrate has a variable thickness.

According to an embodiment of the present invention, the substrate comprises another portion that includes stiffening members.

According to an embodiment of the present invention, the stiffening members include a material transparent at least to radio frequency radiation.

According to one embodiment of the present invention, the stiffening members include a stiffening grid.

According to another embodiment of the present invention, the stiffening elements include stiffening ribs.

According to another general aspect of the present invention, there is provided a dual mode electromagnetic detection system. The system comprises an infrared seeker having an infrared camera, a radio frequency radar having an antenna arrangement, and a protective dome housing the infrared camera and the antenna arrangement. The protective dome includes a substrate having a portion transparent to both infrared radiation and radio frequency radiation. According to an embodiment, the portion of the substrate includes a macromolecular material including a polymer selected from a family of polyolefins. According to yet an embodiment, the polyolefin polymer material includes an antistatic additive.

According to one embodiment, the infrared seeker and said radio frequency radar are configured to share a common aperture.

According to one embodiment, the infrared seeker and said radio frequency radar are configured to share overlapping apertures.

According to a further general aspect of the present invention, there is provided a method for fabrication of a dual mode electromagnetic detection system. The method comprises providing an infrared seeker having an infrared camera, providing a radio frequency radar having an antenna arrangement, and mounting antenna arrangement with respect to the infrared camera such that the infrared camera and the antenna arrangement form overlapping apertures. The method also includes providing a protective dome that includes a substrate having a portion transparent to both infrared radiation and radio frequency radiation. According to an embodiment of the present invention, the protective dome is mounted to house the infrared camera and the antenna arrangement such that the portion that is transparent to both infrared radiation and radio frequency radiation is placed against at least the aperture of the infrared camera. The portion of the substrate that is transparent to both infrared radiation and radio frequency radiation comprises a macromolecular material including a polymer selected from a family of polyolefins.

According to an embodiment, the polyolefin macromolecular material includes an antistatic additive.

The protective dome of the present invention has many of the advantages of the prior art techniques, while simultaneously overcoming some of the disadvantages normally associated therewith.

The protective dome according to the present invention can have enhanced performance in the IR and RF frequency ranges.

The protective dome according to the present invention may be easily and efficiently manufactured.

The protective dome according to the present invention is of durable and reliable construction.

The protective dome according to the present invention may have lower overall operation and maintenance costs.

The protective dome according to the present invention may be mounted flush with the surface of a mounting platform.

The protective dome according to the present invention may be readily conformed to complexly shaped surfaces and desired contours to house an IR camera and an antenna portion of an RF radar.

The protective dome according to the present invention may have a relatively low manufacturing cost.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
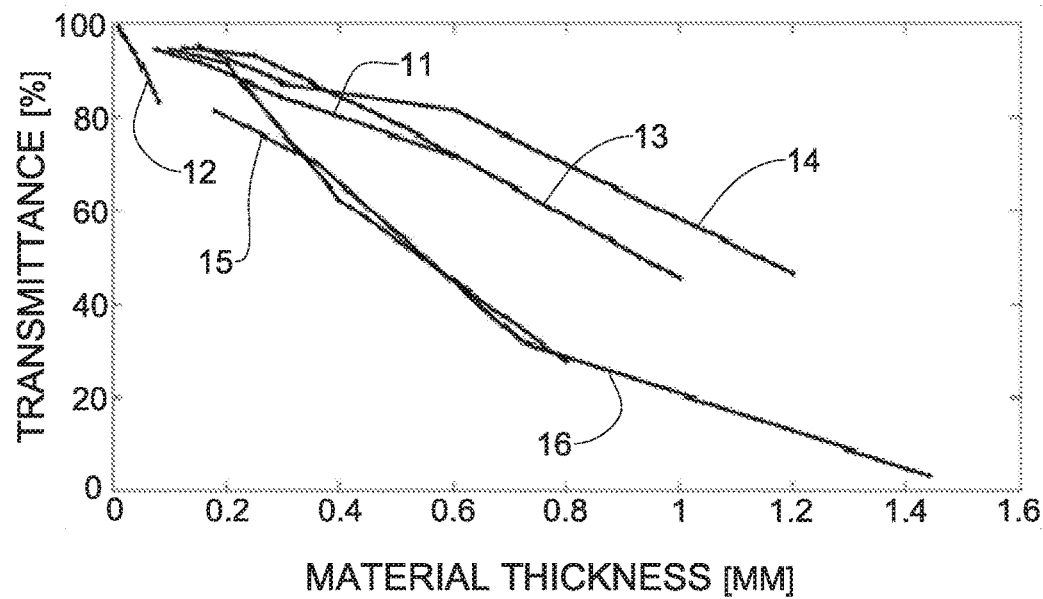
FIG. 1 illustrates a graph of IR transmission in long-wavelength infrared region versus film thickness for six materials selected from polyolefins.

The principles of the dual mode electromagnetic detection system with a protective dome according to the present invention may be better understood with reference to the drawings and the accompanying description, wherein like reference numerals have been used throughout to designate identical elements. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

It should be noted that the blocks as well other elements in these figures are intended as functional entities only, such that the functional relationships between the entities are shown, rather than any physical connections and/or physical relationships. Those versed in the art should appreciate that many of the examples provided have suitable alternatives which may be utilized.

It was noted that dielectric materials from a family of polymers produced from a simple olefin (also called an alkene) as a monomer, have relatively low dielectric permittivity values and low dielectric losses in the IR and RF frequency ranges. This polymer family, which is generally referred to as polyolefins, includes polyethylene, polypropylene, ethylenevinyl acetate, ionomer, polybutylene, polymethylpentene, polydicyclopentadiene, and also their homopolymers and copolymers.

It is therefore believed that these materials can be both IR and RF transparent and therefore be suitable for fabrication of a protective dome for an electromagnetic detection system including both IR seeker and RF radar with a common aperture. To prove this, several materials selected from polyolefins have been examined for IR transmission and RF transmission.

For example, FIG. 1 illustrates the experimental dependence of the IR transmission in long-wavelength infrared region on the film thickness for six materials selected from polyolefin family. The materials were obtained from Goodfellow Cambridge Ltd. The results of the measurements are shown for ultra high density polyethylene P.N. ET301075 (curve 11); high density polyethylene P.N. ET321010 (curve 12); low density polyethylene P.N. ET311250 (curve 13); low density polyethylene Condition: additive free polymer P.N. ET311251 (curve 14), polypropylene (homopolymer) P.N. PP301400 (curve 15), and polypropylene (copolymer) P.N. ET301418 (curve 16).

The IR transmission measurements of the IR transmission were carried out by using a FLIR IR camera operating at a wavelength in the range of 8 micrometers to 14 micrometers. The camera was directed to a warm object located within a cooler background. A distance between the camera and the object was about 2 meters. The camera measured a thermal energy from a rectangular area of the warm object and a thermal energy from a rectangular area of the cooler background for about 10 to 20 second. A sampling was carried out every 0.12 sec to collect 83 to 167 samples.

A film of a tested material having a rectangular shape was placed between the camera and the warm object.

Transmittance was calculated as a ratio between the mean contrast energy $<\Delta E_{with}>$ measured with a material placed between the warm object and the cooler background and the mean contrast energy $<\Delta E_{without}>$ measured without the material. The averaging was carried out over all the collected samples.

As can be seen from the graph in FIG. 1, the IR transmission for samples of ultra high density polyethylene (curve 11), low density polyethylene (curve 13), and low density polyethylene with an additive (curve 14) is better than 50% when the thickness of the polymer films does not exceed 0.5 mm.

Similar measurements of the IR transmission in long-wavelength infrared region were carried for the film samples of the same materials sprinkled with an antistatic spray. In particular, a known 3M Antistatic Electronic Equipment Cleaning Spray containing water, 2-butoxyethanol and isobutene was used in the experiments.

Figure 2:
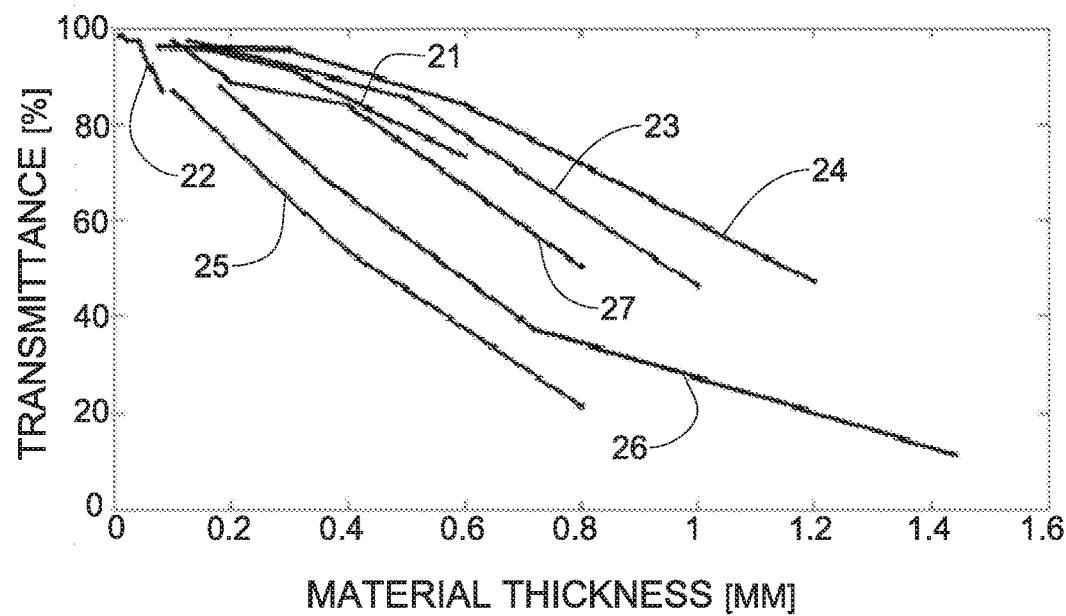
FIG. 2 illustrates a graph of IR transmission in long-wavelength infrared region versus film thickness for the same six materials selected from polyolefins with antistatic additive.

FIG. 2 illustrates the experimental dependence of the IR transmission in long-wavelength infrared region on the film thickness for seven materials selected from polyolefin family. Six materials from these seven materials were obtained from Goodfellow Cambridge Ltd and treated with an antistatic spray by sprinkling over the film's surface before the measurements. The results of the measurements for these materials are shown for ultra high density polyethylene P.N. ET301075 (curve 21); high density polyethylene P.N. ET321010 (curve 22); low density polyethylene P.N. ET311250 (curve 23); low density polyethylene, condition: additive free polymer P.N. ET311251 (curve 24), polypropylene (homopolymer) P.N. PP301400 (curve 25), polypropylene P.N. ET301418 (copolymer) (curve 26). The seventh material was a film of low density polyethylene (Product Key Item: 7100010) obtained from Motinit Technologies Ltd, in which an antistatic additive was added during the production process (curve 27).

As can be seen from the graph in FIG. 2, adding an antistatic spray enhances the IR transmission of the polyolefin films.

Figure 3A:
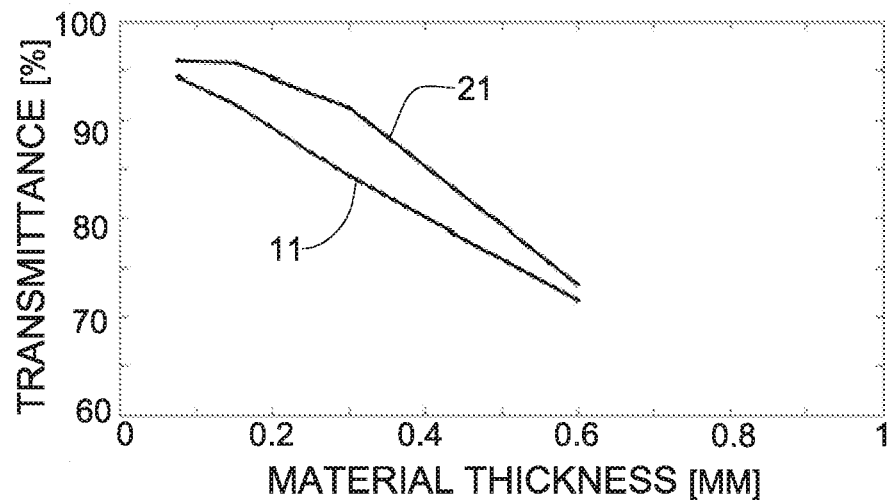
FIG. 3A illustrates a graph of IR transmission in long-wavelength infrared region versus film thickness for a regular ultra high density polyethylene and for the same material with an antistatic additive.
Figure 3B:
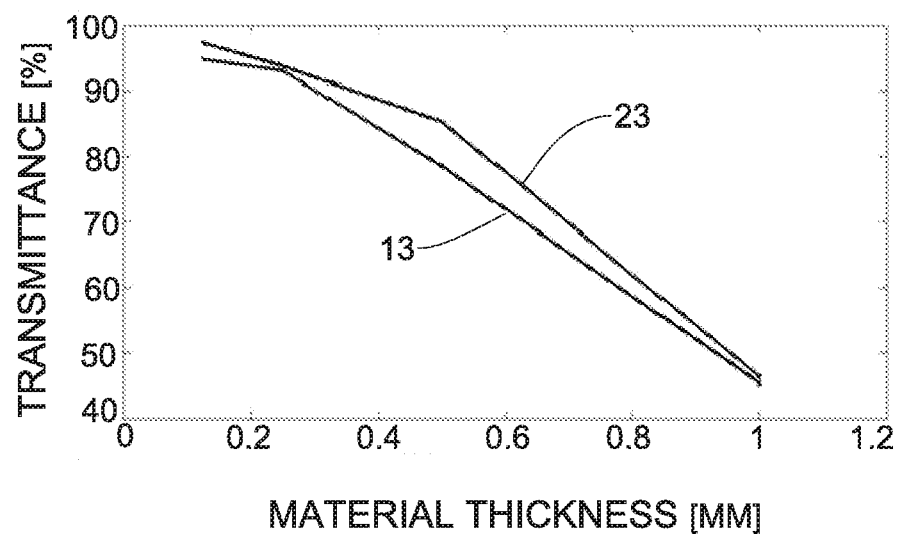
FIG. 3B illustrates a graph of IR transmission in long-wavelength infrared region versus film thickness for a regular low density polyethylene and for the same material with antistatic additive.

For example, as can be seen in FIG. 3A, the IR transmission for samples of a regular ultra high density polyethylene film (curve 11) is increased by about 4% to 13% for an ultra high density polyethylene film which were sprinkled with an antistatic spray (curve 21). Likewise, as can be seen in FIG. 3B, the IR transmission of a regular ultra high density polyethylene film (curve 11) is increased by about 3% to 8% for an ultra high density polyethylene film which were sprinkled with an antistatic spray (curve 21).

Figure 4:
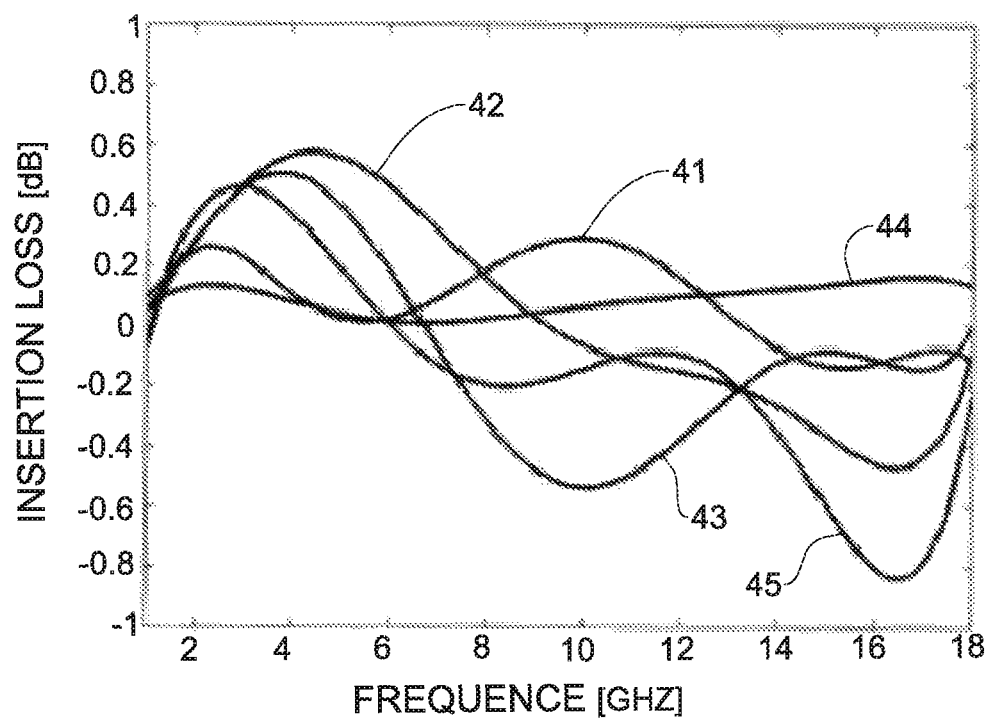
FIG. 4 illustrates a graph of insertion loss versus frequency for five materials selected from polyolefins.

Referring to FIG. 4, five polyolefin film samples were evaluated for RF transmission in the range of 1 GHz to 18 GHz. FIG. 4 shows a graph of insertion loss versus frequency for the following film samples that were treated with 3M Antistatic Electronic Equipment Cleaning spray: high density polyethylene having thickness of 0.32 mm (curve 41); low density polyethylene having thickness of 2 mm (curve 42); low density polyethylene (under condition: additive free polymer) having thickness of 2.4 mm (curve 43); low density polyethylene (with an antistatic additive that was added during the production process) having thickness of 0.8 mm (curve 44), and polypropylene copolymer having thickness of 2.88 mm (curve 45). As can be seen in FIG. 4, all the selected samples illustrate great transmission to RF radiation, and the RF insertion losses do not exceed −0.82 dB in the range of 1 GHz through 18 GHz.

Thus, it is proposed by the inventors to use polymers selected from a family of polyolefins as materials for manufacturing an electromagnetic detection system including both IR seeker and RF radar with a common aperture.

In view of the fact that the IR transparency of the material can be enhanced when an antistatic additive is added to the polyolefin polymers, while RF transparency of the material with antistatic additive does not deteriorates, it is also proposed by the inventors to use polyolefin polymers with an antistatic additive as materials for manufacturing such an electromagnetic detection system.

Figure 5:
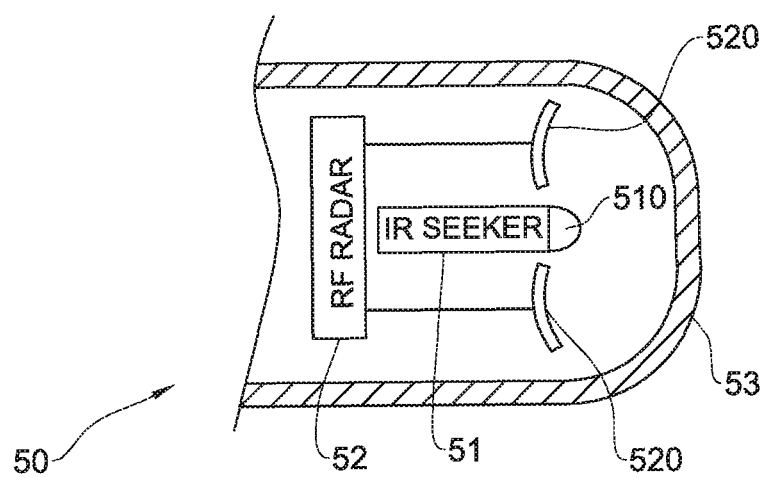
FIGS. 5-9 illustrate schematic cross-sectional views of a dual mode electromagnetic detection system with a protective dome, according to several embodiments of the present invention.

Referring to FIG. 5, a schematic cross-sectional view of a dual mode electromagnetic detection system 50 is illustrated, according to one embodiment of the present invention. The dual mode electromagnetic detection system 50 includes an IR seeker 51 having an IR camera 510, an RF radar 52 having an antenna arrangement 520, and a protective dome 53 housing the IR camera 510 and the antenna arrangement 520.

It should be noted that the subject of this invention is not limited to any particular implementation of the IR camera 510 and the arrangement 520. Hence, in the embodiment shown in FIG. 5 and also in other embodiments described herein below, the IR camera 510 can, for example, be a camera operating in the long-wavelength infrared (LWIR) region. Likewise, the antenna arrangement 520 may be implemented in various alternatives. Examples of the antenna elements of the antenna arrangement 520 include, but are not limited to, patch antenna elements; stacked patch antenna elements, microstrip antenna elements, dipole antenna elements, horn antenna elements, tapered-Slot Antenna (TSA) element (also known as Vivaldi) and other antenna elements or a combination thereof. Consequently, the type, shape and configuration of the antenna elements may be selected to be suitable for the technology adopted for the antenna. The IR camera 510 and the antenna arrangement 520 can, for example, be fixed to a supporting platform (not shown), or mounted on a gimbal arrangement (not shown).

As shown in FIG. 5, the IR camera 510 is mounted within the antenna arrangement 520 in order to provide a common aperture or overlapping apertures for the IR seeker 51 and the RF radar 52, however other configurations are contemplated. In particular, when desired, the IR camera 510 and the antenna arrangement 520 can be mounted aside to each other and have different apertures.

According to the embodiment shown in FIG. 5, the protective dome 53 has a substantially uniform thickness. For example, the thickness can be in the range of 0.2 mm to 2 mm, that can provide great transparency to RF radiation and sufficient transparency to IR radiation.

As shown in FIG. 5, the protective dome 53 has a cup-shaped configuration, however other configurations are contemplated. Thus, at the end that is oriented towards a target (not shown), the protective dome 53 can, for example, be hemispheric or can have other desired configuration. It should be understood that the protective dome is not bound to the scale and proportion illustrated in FIG. 5 and in other drawings.

In general, the protective dome 53 can be made of any suitable materials, and can be made of the same or dissimilar materials.

According to the embodiment shown in FIG. 5, the entire protective dome is made from the same material, such as a macromolecular material selected from a polymer family of polyolefins, however as will be shown herein below other configurations are also contemplated. Examples of the polyolefin polymers suitable for the dome include, but are not limited to, ultra high density polyethylene, high density polyethylene, low density polyethylene and polypropylene.

In view of the fact that the IR transparency of the polyolefin material can be enhanced when an antistatic additive is added to the polymer, while RF transparency of the polyolefin material with antistatic additive does not deteriorates, according to another embodiment of the present invention, the protective dome 53 is made of the polyolefin polymers proposed above with an antistatic additive.

Examples of the antistatic additives suitable for the purpose of the present invention include, but are not limited to, N-(2-hydroxy-3-dodecyloxypropyl) ethanolamine agent, N,N-bis(2-hydroxyethyl) alkylamine agent, ethoxylated amine antistatic agent, tetrahydropyrimidine agent, polyols, polyalkylene glycols and esters and ethers thereof, alkylamines and fatty acid amides, etc. Antistatic additives may be either added into the material bulk or simply sprayed over the material surface.

Techniques for adding antistatic additives into various polymers, such as olefins, are known per se (see, for example, U.S. Pat. Nos. 3,631,162; 3,708,464, and 4,147,742, the description of which is hereby incorporated in its entirety by reference), and therefore are not expounded upon herein in detail.

Figure 6:
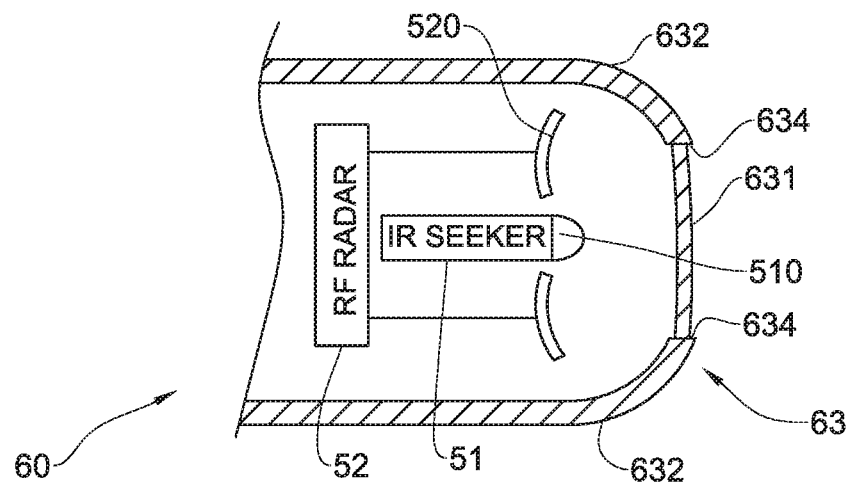

FIG. 6 illustrates a schematic cross-sectional view of a dual mode electromagnetic detection system 60, according to another embodiment of the present invention. The dual mode electromagnetic detection system 60 differs from the dual mode electromagnetic detection system (50 in FIG. 5) in the fact that the thickness of a protective dome 63 changes along its surface. As shown in FIG. 6, the protective dome 63 has a portion 631 that is located at the common aperture or overlapping apertures of the IR seeker 51 and the RF radar 52, and another portion 632 associated with the region outside the aperture of the IR seeker 51.

As can be seen in FIG. 6, a thickness of each portion 631 and 632 is uniform, and the thickness changes abruptly at a seam 634 between these portions. However, when desired, the thickness of the dome 63 can change smoothly, thereby forming a tapered region defining a transitional portion (not shown) between the portions 631 and 632.

Similar to the protective dome 53 in FIG. 5, the protective dome 63 is made entirely from a polyolefin material. The portion 631 has a relatively little thickness that should not prevent transparency both IR and RF radiation. For example, the thickness of the portion 631 can be in the range of 0.2 mm to 2 mm. The remaining portion 632 of the dome 33 has a greater thickness to provide structural strength and rigidity. For example, the thickness of the portion 632 (herein also referred to as "stiff portion") can be in the range of 0.2 mm to 200 mm. Although the stiff portion 632 can decrease transmittance of IR radiation, it does not significantly affect the transmittance of RF radiation. Therefore, this provision can be suitable for the configurations in which a narrow beam of the passive IR seeker 51 enables scanning at angles $\theta_{IR}$ which are less than the scanning angles $\theta_{RF}$ of the RF radar 52.

Figure 7:
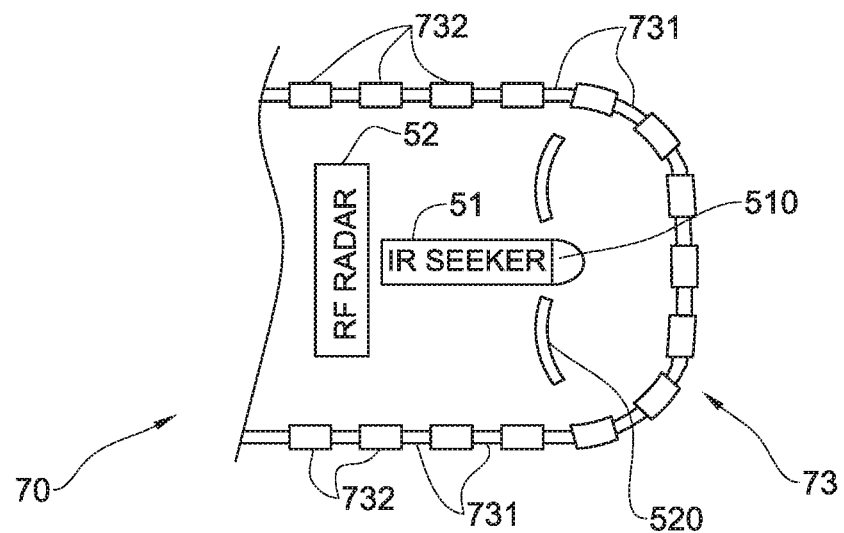

FIG. 7 illustrates a schematic cross-sectional view of a dual mode electromagnetic detection system 70, according to still another embodiment of the present invention. The dual mode electromagnetic detection system 70 differs from the dual mode electromagnetic detection system (60 in FIG. 6) in the fact that the thickness of a protective dome 73 changes several times along its surface.

As shown in FIG. 7, the protective dome 73 has a substantially cup-shaped configuration and includes a plurality of relatively thick stiffening rib regions 732, and a plurality of relatively thin regions 731 arranged between the rib regions 732. According to the embodiment shown in FIG. 7, the rib regions 732 are configured as elongated circular shape parallel members extending into an inner cavity of the dome, and arranged along walls of the dome 73 for reinforcing the dome 73.

Similar to the protective dome 53 in FIG. 5, the protective dome 73 is made entirely from a polyolefin material. The portion of the dome occupied by the thin regions 731 has a relatively little thickness that should not prevent transparency both IR and RF radiation. For example, the thickness of this portion can be in the range of 0.2 mm to 2 mm.

The portion of the dome occupied by stiffening rib regions 732 has a greater thickness to provide structural strength and rigidity. For example, the thickness of the portion associated with stiffening rib regions 732 can be in the range of 0.2 mm to 200 mm. Although the stiff portion can decrease transmittance of IR radiation, it does not significantly affect the transmittance of RF radiation.

It should be noted that although the stiff portion of the dome shown in FIG. 7 includes a plurality of rib regions, when desired the stiff portion can include a stiffening grid region for reinforcing the dome.

Figure 8:
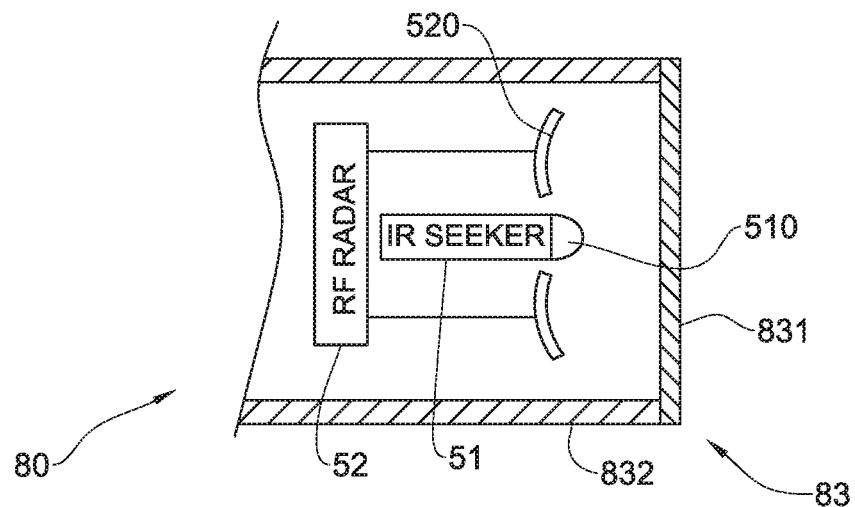

FIG. 8 illustrates a schematic cross-sectional view of a dual mode electromagnetic detection system 80, according to a further embodiment of the present invention. The dual mode electromagnetic detection system 80, differs from the dual mode electromagnetic detection system (50 in FIG. 5) in the fact that only a portion 831 of a protective dome 83 that is located at the common aperture or overlapping apertures of the IR seeker 51 and the RF radar 52 is made of a regular polyolefin polymer and/or polyolefin polymer with an antistatic additive, as above described above, and is therefore transparent to both IR and RF radiation, whereas another portion 832 of the dome 83 is made from another material that is transparent only to RF radiation. The portions 831 and 832 are connected together to form an integral structure of the dome 83. The portions 831 and 832 can, for example, be glued, bolted or latched together, however other suitable connecting means can also be used.

According to an embodiment of the present invention, the materials of the portion 832 that is transparent only to RF radiation can be more rigid and hardened than polyolefin materials in order to provide structural strength and rigidity, and to withstand harsh conditions during exploitation. Examples of the materials suitable for fabrication of the portion 832 of the dome 83 that is transparent only to RF radiation include, but are not limited to REXOLITE™, TEFLON™, KEVLAR™, Quartz, Alumina, Slip-Cast Fused Silica, etc.

This provision can be sufficient for the configurations in which a narrow beam of the passive IR seeker enables scanning at angles $\theta_{IR}$ which are less that the scanning angles $\theta_{RF}$ of the RF radar 52.

Figure 9:
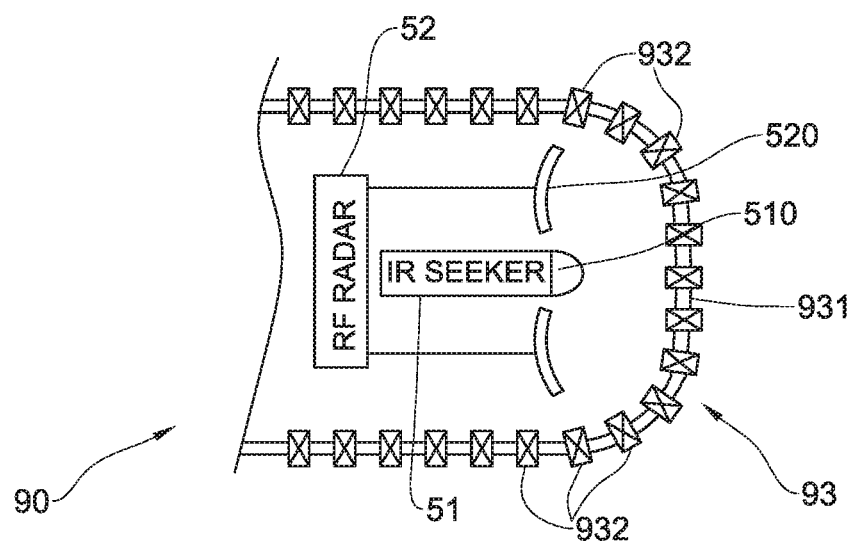

FIG. 9 illustrates a schematic cross-sectional view of a dual mode electromagnetic detection system 90, according to a further embodiment of the present invention. The protective dome 93 has a substantially cup-shaped configuration and includes a portion associated with plurality of stiffening ribs 932 forming a carcass structure that is made from a relatively stiff material, and another portion associated with a cover film 931 that is made of a polyolefin material and configured for coating the carcass structure. As shown in FIG. 9, the rib regions 932 are configured as elongated circular shape parallel members arranged along walls of the dome 93 for reinforcing the dome.

It should be noted that although the carcass structure of the dome shown in FIG. 9 includes a plurality of stiffening ribs 932 for reinforcing the dome 93, when desired the carcass structure can include a stiffening grid.

The term "coating" here has a broad meaning. Thus, according to one embodiment, the cover film 931 is attached to the carcass structure from outside of the carcass structure and wrapping thereof. According to another embodiment, the cover film 931 is attached to the stiffening ribs 932 from inside of the carcass structure. Likewise, the stiffening ribs 932 can be embedded into the cover film 931. The cover film 931 that is made of a regular polyolefin polymer and/or a polyolefin polymer with an antistatic additive, as described above, and is therefore transparent to both IR and RF radiation. Examples of the polyolefin polymers suitable for the dome include, but are not limited to, ultra high density polyethylene, high density polyethylene, low density polyethylene and polypropylene.

The stiffening ribs 932 of the carcass structure of the dome 93 are made from a relatively stiff material that can be transparent either to both IR and RF radiation or only to RF radiation. Examples of the materials suitable for fabrication of the carcass structure of the dome 93 include, but are not limited to, REXOLITE™, TEFLON™, KEVLAR™, Quartz, Alumina, Slip-Cast Fused Silica, etc.

The thickness of the polymeric film 931 coating the carcass structure should be chosen appropriately in order to provide transparency both IR and RF radiation. For example, the thickness of polymeric film 931 can be in the range of 0.2 mm to 2 mm. The thickness of the portion associated with the carcass structure can be in the range of 0.2 mm to 200 mm. Although the stiff portion can decrease transmittance of IR radiation, it does not significantly affect the transmittance of RF radiation.

Methods for coating the stiffening ribs 932 with a cover film may be very different, such as gluing the film to the wire, placing the film to the wires from the solution, the growing film directly on the carcass by immersing it in a special solution, melting polymeric films around the carcass, etc.

According to an embodiment of the present invention, the dual mode electromagnetic detection system can further include an electro-optical processing system (not shown) coupled to the IR seeker and to the RF radar, and configured for detecting a target (not shown) reflected and/or a target originating radiation in chosen radio frequency and infrared frequency ranges, respectively. The dual mode electromagnetic detection system of the present invention can, for example, be used as a part of a path control system of a missile. Thus, the signals provided by the IR seeker and to the RF radar can, for example, be used to steer the missile towards the target.

As such, those skilled in the art to which the present invention pertains, can appreciate that while the present invention has been described in terms of preferred embodiments, the concept upon which this disclosure is based may readily be utilized as a basis for the designing of other structures and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A protective dome for an electromagnetic detection system, the protective dome comprising:
   a substrate having a portion transparent to both infrared radiation and radio frequency radiation with a transmission for said infrared radiation better than 50% in a wavelength range of 8 micrometers to 14 micrometers, and with insertion losses not exceeding −0.82 dB in a frequency range of 1 GHz through 18 GHz;

wherein said portion of the substrate comprises at least one macromolecular material selected from the group consisting of polyethylene and polypropylene, and an antistatic additive.

2. The protective dome of claim 1, wherein said substrate has a uniform thickness.

3. The protective dome of claim 1, wherein said substrate has a variable thickness.

4. The protective dome of claim 1, wherein said substrate comprises another portion, wherein said another portion includes stiffening members.

5. The protective dome of claim 4, wherein said another portion includes a material transparent at least to radio frequency radiation.

6. The protective dome of claim 4, wherein said stiffening members include a stiffening grid.

7. The protective dome of claim 4, wherein said stiffening elements includes stiffening ribs.

8. A dual mode electromagnetic detection system, comprising:
    an infrared seeker having an infrared camera;
    a radio frequency radar having an antenna arrangement; and
    a protective dome housing the infrared camera and the antenna arrangement, said protective dome comprising a substrate having a portion transparent to both infrared radiation and radio frequency radiation with a transmission for said infrared radiation better than 50% in the wavelength range of 8 micrometers to 14 micrometers, and with insertion losses not exceeding −0.82 dB in the frequency range of 1 GHz through 18 GHz, wherein said portion of the substrate comprises at least one macromolecular material selected from the group consisting of polyethylene and polypropylene, and an antistatic additive.

9. The system of claim 8, wherein said infrared seeker and said radio frequency radar are configured to share a common aperture.

10. The system of claim 8, wherein said infrared seeker and said radio frequency radar are configured to share an overlapping aperture.

11. A method for fabrication of a dual mode electromagnetic detection system, the method comprising:
    providing an infrared seeker having an infrared camera;
    providing a radio frequency radar having an antenna arrangement;
    mounting the antenna arrangement with respect to the infrared camera such that the infrared camera and the antenna arrangement form overlapping apertures;
    providing a protective dome comprising a substrate having a portion transparent to both infrared radiation and radio frequency radiation with a transmission for said infrared radiation better than 50% in a wavelength range of 8 micrometers to 14 micrometers, and with insertion losses not exceeding −0.82 dB in a frequency range of 1 GHz through 18 GHz, and
    mounting the protective dome to house the infrared camera and the antenna arrangement such that the portion that is transparent to both infrared radiation and radio frequency radiation is placed against the aperture of the infrared camera;
    wherein said portion of the substrate comprises at least one macromolecular material selected from the group consisting of polyethylene and polypropylene, and an antistatic additive.

12. The method of claim 11, wherein said an antistatic additive is added in the bulk of the at least one macromolecular material.

13. The method of claim 11, wherein said an antistatic additive is sprinkled over a surface of the at least one macromolecular material.

* * * * *